Patented May 28, 1940

2,202,063

UNITED STATES PATENT OFFICE 2,202,063

MANUFACTURE OF BENZOPHENONE POLY-CARBOXYLIC ACIDS

James Ogilvie, Buffalo, N. Y., assignor to National Aniline & Chemical Company, Inc., New York, N. Y., a corporation of New York No Drawing. Application January 8, 1938, Serial No. 184,021

19 Claims. (Cl. 260—524)

This invention relates to a process for the preparation of polycarboxylic acids of benzophenone compounds by the oxidation of alkyl benzophenone carboxylic acid compounds. It relates more particularly to the preparation of dicarboxylic acids of benzophenone by the oxidation of alkyl benzophenone monocarboxylic acids, and especially to the preparation of 2,4'-benzophenone dicarboxylic acid by the oxidation of 4'-methyl-benzoyl-2-benzoic acid (p-toluyl-o-benzoic acid).

Various processes have been proposed for the oxidation of p-toluyl-o-benzoic acid and related alkyl benzophenone carboxylic acids to prepare benzophenone dicarboxylic acids. One method which has been described in patents (cf. German Patent No. 80,407) and other publications comprises dissolving p-toluyl-o-benzoic acid in an aqueous solution of caustic alkali, adding potassium permanganate, and heating the resulting solution until the methyl group of the toluyl-o-benzoic acid has been oxidized to a carboxylic acid group. In this process, the manganese dioxide formed by the decomposition of the potassium permanganate is insoluble in the solution containing the alkali metal salt of the dicarboxylic acid and is separated therefrom by filtration. This process has several practical disadvantages, among which may be mentioned the relatively high cost of potassium permanganate and the fact that the manganese dioxide ordinarily cannot be reused satisfactorily and must be discarded. Also, the expense involved in operating in accordance with this process is particularly high because of the necessity of employing a substantial excess of potassium permanganate in order to obtain maximum yields of the benzophenone dicarboxylic acid.

It is an object of the present invention to provide a novel and efficient process for the preparation of benzophenone polycarboxylic acid compounds.

A further object of the invention is to provide a process for the preparation of dicarboxylic acids of benzophenone compounds by the oxidation of alkyl benzophenone monocarboxylic acid compounds in which substantially theoretical yields are obtainable, and in which a valuable by-product is recovered.

A more specific object of the invention is to provide a process for the preparation of 2,4'-benzophenone dicarboxylic acid compounds by the oxidation of 4'-methyl-benzoyl-2-benzoic acid compounds which represents considerable economies over prior processes.

Other objects of the invention will in part be obvious, and will in part appear hereinafter.

It has been found in accordance with the present invention that a benzophenone compound containing at least one free carboxylic acid group and at least one nuclear alkyl group can be efficiently converted to the corresponding polycarboxylic acid compound by subjecting the alkyl benzophenone carboxylic acid compound to the action of a polychromate or chromic acid in the form of an aqueous solution at a temperature above about 150° C. This process has been found to be particularly valuable for the preparation of 2,4'-benzophenone dicarboxylic acid by the oxidation of 4'-methylbenzoyl-2-benzoic acid (p-toluyl-o-benzoic acid) in the form of the free acid.

The invention accordingly comprises the several steps and the relation of one or more of such steps with respect to the others thereof, which will be exemplified in the process hereinafter disclosed. The scope of the invention will be indicated in the claims.

The process is preferably carried out by heating a mixture containing an alkyl benzophenone carboxylic acid compound, a polychromate or chromic acid, and water at a temperature above about 150° C. In order to maintain the mixture at a temperature of this order, it is heated under superatmospheric pressure in an autoclave.

In the development of the present invention, it was found that effectve oxidation of alkyl benzophenone carboxylic acid compounds with chromate oxidizing agents is not accomplished if the oxidation mixture becomes too strongly alkaline during the reaction. By using a polychromate or chromic acid as the oxidizing agent, it was found that the reaction proceeds efficiently due to the fact that the oxidation mixture does not become strongly alkaline. Thus in cases where a polychromate; e. g., sodium or potassium dichromate, is employed, the free carboxylic acid group in the starting material and the one or more carboxylic acid groups formed by the oxidation of the alkyl group or groups attached to the benzophenone nucleus are available to neutralize at least part, and in preferred practice substantially all, of the alkali released by the decomposition of the polychromate; and in cases where chromic acid is employed for the oxidation, no alkali is released.

Due to simplicity of operation, the process is preferably carried out using a polychromate, as distinguished from chromic acid, as the oxidizing agent. The polychromates which may be used are, for example, the dichromates, the trichromates, and the tetrachromates of a metal or basic group; i. e., a cation. Examples of such polychromates are the di-, tri-, or tetrachromates in which the cations are the alkali metals (e. g., sodium and potassium), the alkaline earth metals or magnesium. In carrying out the process with a polychromate, the invention in its preferred aspects involves the selection of a polychromate such that the free carboxylic acid groups present in the final benzophenone polycarboxylic acid compound (including the one or more originally present and the one or more formed in the reaction) are at least numerically equal to the total valence of the cation in the polychromate. The oxidation mixture in these cases is maintained non-alkaline due to the reaction between the products of the oxidation reaction.

The expression "the total valence of the cation in the polychromate" will be understood to mean the valence of the cation in the polychromate when used in the proportion theoretically required to oxidize the alkyl group or groups of the alkyl benzophenone carboxylic acid compound to carboxylic acid groups. For example, where the cation of the polychromate employed has a valence of two, and two mols of the polychromate are theoretically required to oxidize each mol of the alkyl benzophenone carboxylic acid compound, the "total valence" of the cation in the polychromate is four. It will be understood that the term "total valence" as used in the claims has this meaning. In the case of a polychromate in which the metal or basic group has a valence of one, and one mol of the polychromate is theoretically required, the total valence of the cation in the polychromate is two.

In order that the invention may be more easily understood, the following equations are given. These equations illustrate the probable reactions taking place in several processes embodying the invention. The formua, R(COOH)—CH$_3$, in the equations represents a methyl benzophenone monocarboxylic compound of the type disclosed herein as a starting material:

(1) $R(COOH)—CH_3 + Na_2Cr_2O_7 \rightarrow$
$R—(COONa)_2 + Cr_2O_3 + 2H_2O$ (2) $3R(COOH)—CH_3 + 2Na_2Cr_3O_{10} \rightarrow$
$3R—(COONa)_2 + 3Cr_2O_3 + 5H_2O$ (3) $2R(COOH)—CH_3 + Na_2Cr_4O_{13} \rightarrow$
$2R(COOH)—COONa + 2Cr_2O_3 + 3H_2O$ (4) $R(COOH)—CH_3 + 2H_2CrO_4 \rightarrow$
$R(COOH)_2 + Cr_2O_3 + 3H_2O$ As above indicated, the process of preparing 2,4'-benzophenone dicarboxylic acid by the reaction between 4'-methyl-benzoyl-2-benzoic acid in the form of the free acid and sodium dichromate in an aqueous solution at a temperature above about 150° C. is a preferred embodiment of the present invention. This process offers an outstanding example of practicing the invention in a manner such that the carboxylic acid groups in the final product are numerically equal to the total valence of the cation (sodium) present in the initial sodium dichromate and released in the reaction. The reaction occurring in this process may be represented by the following equation:

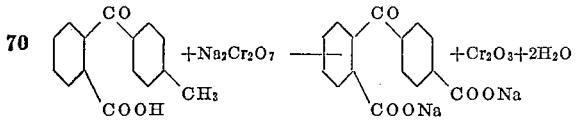

From the equation it is apparent there is a balance between the carboxylic acid groups and the sodium released by the decomposition of the sodium dichromate so that the resulting solution is substantially neutral. Since the Cr$_2$O$_3$ is insoluble in neutral solutions, as the reaction proceeds, the Cr$_2$O$_3$ appears in the form of finely divided, suspended particles which, after cooling the solution is removed therefrom in any suitable manner. The Cr$_2$O$_3$ recovered in this way may be reconverted to a dichromate in known manner, or it may be treated so as to prepare it for use as a pigment having considerable value in various industries. The 2,4'-benzophenone dicarboxylic acid may be recovered from the filtrate in any desired or known manner. For example, acid may be added to the filtrate to convert the sodium salt to the free acid, which is insoluble and may be precipitated and separated from the residual solution.

Although the present process has particular application for the preparation of benzophenone dicarboxylic acid compounds from alkyl benzophenone monocarboxylic acid compounds, it is also applicable for the preparation of other benzophenone carboxylic acid compounds from alkyl benzophenone carboxylic acid compounds containing more than one carboxylic acid group. In the oxidation of such compounds, they may be employed in the form of their partial salts (having at least one free carboxylic acid group) or in the form of their free acids. For example, the monosodium salt of methyl-benzophenone dicarboxylic acid may be efficiently oxidized in substantially neutral aqueous solution with sodium dichromate at a temperature above about 150° C., in which case the oxidation solution remains substantially neutral since the oxidized product contains two free carboxylic acid groups available to neutralize the alkali released by the decomposition of the dichromate. When the free polycarboxylic acid compound is employed, an alkali or other metal compound forming a soluble salt of the acid may be added and the resulting solution separated from the insoluble Cr$_2$O$_3$.

As already indicated, in the oxidation of alkyl benzophenone carboxylic acid compounds with polychromates, the invention is preferably practiced by using in the reaction a polychromate such that the carboxylic acid groups in the resulting oxidized benzophenone compound are capable of at least neutralizing the alkali released in the decomposition of the polychromate. In some cases, however, because of economic reasons or other factors, a polychromate may be selected for use in the oxidation such that the alkali released in the decomposition of the polychromate is not completely neutralized. Nevertheless, the alkali is substantially neutralized even in these cases. For example, if an alkyl benzophenone carboxylic acid compound containing two alkyl groups and one free carboxylic acid group is used as the starting material and sodium dichromate is used as the oxidizing agent, and these substances are employed in theoretical proportions, the resulting mixture will contain one molecule of sodium hydroxide for each molecule of the completely neutralized tricarboxylic acid benzophenone compound obtained as a final product. While these conditions are not preferred, the greater proportion of the sodium released will have been neutralized and the relatively small proportion of alkali in the mixture does not have a critical effect on the operativeness of the process.

The process of the present invention may be employed for the preparation of substituted as well as unsubstituted benzophenone polycarboxylic acid compounds since substituted or unsubstituted alkyl benzophenone carboxylic acid compounds may be used as starting materials. Thus, alkyl benzophenone carboxylic acid compounds which contain substituents such as, for example, chlorine, hydroxyl, and alkoxyl groups, etc., may be used as starting materials. As examples of such substituted compounds may be mentioned 3'-chlor-4'-methyl-2-benzoyl benzoic acid, 2'-hydroxy-5'-chlor-4'-methyl - 2 - benzoyl benzoic acid, and 2'-methoxy-5'-chlor-4'-methyl-2-benzoyl benzoic acid. Furthermore, while it is preferred to employ substituted or unsubstituted alkyl benzophenone carboxylic acid compounds in which the alkyl group is a methyl group as the starting materials in the present process, it is to be understood the invention is not limited to the employment of such compounds, but that alkyl benzophenone carboxylic acid compounds which contain other alkyl groups such as, for example, ethyl, propyl, butyl, and amyl groups may also be employed.

From the above discussion, it will be apparent that in referring to a benzophenone compound containing at least one free carboxylic acid group and at least one nuclear alkyl group, it is intended to include compounds of this type which may or may not contain additional substituents and in which the alkyl group or groups may be attached to the same or a different benzene nucleus from that to which at least one of the free carboxylic acid groups is attached. The preferred compounds for use as starting materials in the present process, however, are alkyl benzophenone carboxylic acid compounds that contain but one alkyl group which is attached to a different benzene nucleus from the benzene nucleus to which the free carboxylic acid group is attached.

In order that the invention may be more fully understood, the following example is given in which the parts are by weight and the temperatures are in degrees Centigrade. It will be understood, however, the invention is not limited thereto since many variations will be readily apparent to those skilled in the art.

*Example.*—A mixture of 110 parts sodium dichromate ($Na_2Cr_2O_7 \cdot 2H_2O$), 80 parts of 4'-methyl-benzoyl-2-benzoic acid and 500 parts water is heated in an autoclave to a temperature between 230° and 235°, and is maintained at that temperature for about 7 hours. The resulting mixture, which then consists chiefly of insoluble chromium sesquioxide suspended in an aqueous solution of the sodium salt of 2,4'-benzophenone dicarboxylic acid, is cooled to a convenient temperature between about 35° and about 100°, and filtered in the usual manner. The insoluble residue of chromium sesquioxide is washed with several portions of hot water until a sample of wash liquid, as it comes from the filter, remains practically clear when acidified with mineral acid. The filtrate and washings comprise an aqueous solution of the sodium salt of 2,4'-benzophenone dicarboxylic acid. The free acid is precipitated from this solution by addition thereto of sulfuric acid until the solution is acid when tested with Congo paper. The precipitated product is filtered in the usual manner, and is washed with several portions of water until a sample of filtered wash water, as it comes from the filter, is practically neutral to Congo paper. At this stage, the washed filter-cake of 2,4'-benzophenone dicarboxylic acid is practically free of mineral acid. The cake may be dried in air at about 100° or in vacuo at lower temperatures. A yield of 84 parts of dry 2,4'-benzophenone dicarboxylic acid is thus obtained. The dry compound is a white crystalline solid which melts at 235° and assays at a purity of 98 to 100 per cent. Tests indicate that this compound is substantially completely free of 4'-methyl-benzoyl-2-benzoic acid; i.e., that the oxidation has gone to completion.

In proceeding in accordance with the above example, the temperature may vary within relatively wide limits so long as it is maintained above about 150° C. It has been found, however, that somewhat more elevated temperatures are effective to increase the efficiency of the process. Thus, at temperatures above 230° C. and particularly at temperatures within the range of from about 230° to about 250° C., benzophenone carboxylic acid compounds are obtained in substantially theoretical yields when approximately stoichiometric proportions of the alkyl benzophenone carboxylic acid and a dichromate are employed. There is a definite relation between the temperature and the amount of dichromate necessary to be employed for efficient operation of the process, but at temperatures considerably below 230° C. even with the use of an excess of dichromate or a protracted reaction period somewhat lower yields and quality of benzophenone carboxylic acids are obtained. Within the range of about 230° C. to about 235° C., high yields and quality of benzophenone dicarboxylic acids may be obtained from alkyl benzoyl benzoic acids with the use of about 1.11 mol equivalents of sodium dichromate ($Na_2Cr_2O_7 \cdot 2H_2O$) for each mol equivalent of the alkyl benzoyl benzoic acid. By increasing the reaction temperature above 235° C., it is possible to maintain the high percentage of yield and quality of the product while employing reduced amounts of dichromate. Thus, when the reaction is carried out at a temperature of about 250° C. and one mol equivalent of dichromate is employed for each mol equivalent of alkyl benzoyl benzoic acid, the oxidation proceeds in a manner comparable to that of the foregoing example.

In place of the sodium dichromate of the foregoing example, there may be employed equivalent amounts of other polychromates; e. g., alkali metal, alkaline earth metal, or magnesium dichromates, trichromates, tetrachromates, and of chromic acid. Also, in place of the alkyl benzophenone carboxylic acid compound used as a starting material in the example, there may be employed any of the benzophenone compounds containing at least one free carboxylic acid group and at least one nuclear alkyl group hereinabove disclosed.

When chromic acid is employed for the oxidation of alkyl benzophenone carboxylic acid compounds, the benzophenone di-, or other polycarboxylic acid formed in the resulting solution is in the form of the free acid. Since these acids are insoluble in slightly acid aqueous solutions, they are precipitated along with the $Cr_2O_3$. The benzophenone polycarboxylic acid compound precipitated in this way may be easily recovered from the precipitate by lixiviating it with an aqueous solution of caustic alkali or the like, whereby a soluble salt of the benzophenone polycarboxylic acid is formed and may be easily separated from the insoluble $Cr_2O_3$.

Since in carrying out the above process changes may be made without departing from the scope of the invention, it is intended that all matter contained in the above description shall be

I claim:

1. The process for the preparation of a benzophenone polycarboxylic acid compound which comprises heating a benzophenone compound containing at least one free carboxylic acid group and at least one nuclear alkyl group with an oxidizing agent selected from the group consisting of the polychromates and chromic acid at a temperature above 150° C.

2. The process for the preparation of a benzophenone polycarboxylic acid compound which comprises heating a benzophenone compound containing at least one free carboxylic acid group and at least one nuclear alkyl group with an aqueous solution of a polychromate at a temperature above 150° C.

3. The process for the preparation of a benzophenone polycarboxylic acid compound which comprises heating a benzophenone compound containing at least one free carboxylic acid group and at least one nuclear alkyl group with an oxidizing agent selected from the group consisting of the polychromates and chromic acid in aqueous solution at a temperature within the range of from about 230° C. to about 250° C.

4. The process for the preparation of a benzophenone polycarboxylic acid compound which comprises heating a benzophenone compound containing at least one free carboxylic acid group and at least one nuclear methyl group with an oxidizing agent selected from the group consisting of the polychromates and chromic acid in aqueous solution at a temperature of from about 230° to about 235° C.

5. The process for the preparation of a benzophenone polycarboxylic acid compound which comprises heating a benzophenone compound containing at least one free carboxylic acid group and an alkyl group, the alkyl group being attached to a different benzene nucleus from at least one free carboxylic acid group, with an oxidizing agent selected from the group consisting of the polychromates and chromic acid in aqueous solution at a temperature above 150° C.

6. The process for the preparation of a benzophenone polycarboxylic acid compound which comprises heating a benzophenone polycarboxylic acid compound containing at least one free carboxylic acid group and one nuclear alkyl group, the alkyl group being attached to a different benzene nucleus from at least one free carboxylic acid group, with an oxidizing agent selected from the group consisting of the polychromates and chromic acid in aqueous solution at a temperature of from about 230° to about 250° C.

7. The process for the preparation of a benzophenone polycarboxylic acid compound which comprises heating a benzophenone compound containing at least one free carboxylic acid group and at least one nuclear alkyl group with an oxidizing agent selected from the group consisting of the polychromates and chromic acid in substantially neutral aqueous solution at a temperature above 150° C.

8. The process for the preparation of a benzophenone polycarboxylic acid compound which comprises heating a benzophenone compound containing at least one free carboxylic acid group and at least one nuclear alkyl group with a polychromate in substantially neutral aqueous solution at a temperature above 150° C.

9. The process for the preparation of a benzophenone polycarboxylic acid compound which comprises preparing an aqueous mixture containing a benzophenone compound containing at least one free carboxylic acid group and at least one nuclear alkyl group, and a polychromate, said benzophenone compound and said polychromate being so related that the free carboxylic acid groups in the benzophenone polycarboxylic acid compound derivable from said benzophenone compound by oxidation are at least numerically equal to the "total valence" of the cation of said polychromate, and heating the mixture at a temperature above 150° C. to convert said benzophenone compound to said benzophenone polycarboxylic acid compound.

10. The process for the preparation of a benzophenone polycarboxylic acid compound which comprises preparing an aqueous mixture containing a benzophenone compound containing at least one free carboxylic acid group and at least one nuclear methyl group, and an alkali metal polychromate, said benzophenone compound and said polychromate being so related that the free carboxylic acid groups in the benzophenone polycarboxylic acid compound derivable from said benzophenone compound by oxidation are at least numerically equal to the "total valence" of the alkali metal atoms in the polychromate, and heating the mixture to a temperature above 150° C. to convert said benzophenone compound to said benzophenone polycarboxylic acid compound.

11. The process for the preparation of a benzophenone polycarboxylic acid compound which comprises preparing an aqueous mixture containing a benzophenone compound containing at least one free carboxylic acid group and one nuclear alkyl group, the alkyl group being attached to a different benzene nucleus from at least one free carboxylic acid group, and an alkali metal polychromate, said benzophenone compound and said polychromate being so related that the free carboxylic acid groups in the benzophenone polycarboxylic acid compound derivable from said benzophenone compound by oxidation are at least numerically equal to the "total valence" of the alkali metal atoms in the polychromate, and heating the mixture at a temperature above 150° C. to convert said benzophenone compound to said benzophenone polycarboxylic acid compound.

12. The process for the preparation of a benzophenone polycarboxylic acid compound which comprises preparing an aqueous mixture containing a benzophenone compound containing at least one free carboxylic acid group and at least one nuclear alkyl group, and an alkali metal dichromate, said benzophenone compound and said dichromate being so related that the free carboxylic acid groups in the benzophenone polycarboxylic acid compound derived from said benzophenone compound by oxidation are at least numerically equal to the "total valence" of the alkali metal atoms in the dichromate, and heating the mixture at a temperature above 150° C. to convert said benzophenone compound to said benzophenone polycarboxylic acid compound.

13. The process for the preparation of a benzophenone dicarboxylic acid compound which comprises heating a benzophenone compound containing one free carboxylic acid group and one nuclear alkyl group attached to different benzene nuclei with an alkali metal polychromate in substantially neutral aqueous solution at a temperature above 150° C.

14. The process for the preparation of a benzophenone dicarboxylic acid compound which comprises heating a benzophenone compound containing one free carboxylic acid group and one nuclear alkyl group attached to different benzene nuclei with an alkali metal dichromate in substantially neutral aqueous solution at a temperature within the range of about 230° C. to about 250° C.

15. The process for the preparation of a benzophenone dicarboxylic acid compound which comprises heating a benzophenone compound containing one free carboxylic acid group and one nuclear methyl group attached to different benzene nuclei with an alkali metal dichromate in substantially neutral aqueous solution at a temperature above 150° C.

16. The process for the preparation of a 2,4'-benzophenone dicarboxylic acid compound which comprises heating a 4'-methyl-benzoyl-2-benzoic acid compound with an alkali metal dichromate in substantially neutral aqueous solution at a temperature of above 150° C.

17. The process for the preparation of a 2,4'-benzophenone dicarboxylic acid compound which comprises heating a 4'-methyl-benzoyl-2-benzoic acid compound with an alkali metal dichromate in substantially neutral aqueous solution at a temperature within the range of about 230° C. to about 250° C., and at a superatmospheric pressure, filtering the resulting solution, acidifying the filtrate to obtain a 2,4'-benzophenone dicarboxylic acid compound in the form of the free acid, and recovering said free acid.

18. The process for the preparation of a 2,4'-benzophenone dicarboxylic acid compound which comprises heating a 4'-methyl-benzoyl-2-benzoic acid compound with an alkali metal dichromate in substantially neutral aqueous solution at a temperature within the range of about 230° C. to about 235° C., and at a superatmospheric pressure, filtering the resulting solution, acidifying the filtrate to obtain a 2,4'-benzophenone dicarboxylic acid compound in the form of the free acid, and recovering said free acid.

19. The process for the preparation of 2,4'-benzophenone dicarboxylic acid which comprises preparing a substantially neutral aqueous solution containing 4'-methyl-benzoyl-2-benzoic acid and sodium dichromate in proportions of about 1.11 mol of the sodium dichromate for each mol of 4'-methyl-benzoyl-2-benzoic acid, heating the solution in an autoclave for a period of about 7 hours while maintaining a temperature from about 230° C. to about 235° C., filtering the resulting solution, acidifying the filtrate until acid when tested with Congo paper, to precipitate the free 2,4'-benzophenone dicarboxylic acid, and separating the free 2.4'-benzophenone dicarboxylic acid from the solution.

JAMES OGILVIE.